United States Patent [19]
Saitoh et al.

[11] Patent Number: 5,502,613
[45] Date of Patent: Mar. 26, 1996

[54] SUPERCONDUCTING MAGNET ABNORMALITY DETECTION AND PROTECTION APPARATUS

[75] Inventors: Toshio Saitoh; Teruhiro Takizawa, both of Hitachi; Naoki Maki, Ibaraki; Takashi Kobayashi, Hitachiota; Masayuki Shibata, Hitachi; Ken Yoshioka, Hitachiota; Tadasi Sonobe, Iwaki; Fumio Suzuki, Hitachi, all of Japan

[73] Assignee: Hitachi, Ltd., Tokyo, Japan

[21] Appl. No.: 87,417

[22] Filed: Jul. 8, 1993

[30] Foreign Application Priority Data

Jul. 15, 1992 [JP] Japan .................................. 4-188352

[51] Int. Cl.⁶ ....................................................... H02H 7/00
[52] U.S. Cl. ............................ 361/19; 361/144; 104/284
[58] Field of Search ....................... 361/19, 144; 104/284, 104/282, 281

[56] References Cited

U.S. PATENT DOCUMENTS

| | | | |
|---|---|---|---|
| 3,724,388 | 4/1973 | Karch | 104/148 |
| 3,742,862 | 7/1973 | Gebhardt et al. | 104/148 |
| 4,868,208 | 9/1989 | Bohn | 361/144 |
| 4,913,059 | 4/1990 | Fujie et al. | 104/282 |

FOREIGN PATENT DOCUMENTS

| | | |
|---|---|---|
| 2291075 | 6/1976 | France . |
| 3905582 | 7/1989 | Germany . |
| 54-95196 | 7/1979 | Japan . |
| 1-23512 | 1/1989 | Japan . |

*Primary Examiner*—Todd Deboer
*Attorney, Agent, or Firm*—Antonelli, Terry, Stout & Kraus

[57] ABSTRACT

A superconducting magnet abnormality detection and protection apparatus is for early and surely detecting abnormality in superconducting coils mounted on a vehicle and protecting the superconducting coils. Magnetic flux detecting devices are mounted inside an outer vessel, which is a vacuum container of a superconducting magnet, so as to be opposite to the superconducting coil. Voltages induced in the magnetic flux detecting devices are detected. Voltage signals are led to a decision device. By monitoring the change of the voltage signals with time in a comparing judgment device, it is determined whether there is an abnormality. If there is an abnormality, an alarm indicator informs of an abnormal state, and a protection device takes protection measures such as interruption of the current of the superconducting magnet. Owing to such configuration, heat does not penetrate from the outside into the superconducting coil via instrumentation lead wires of the magnetic flux detecting devices. Magnitudes of vibration and displacement of the superconducting coil can be detected without contacting the superconducting coil. By always monitoring these signals, it becomes possible to early detect an abnormality in the superconducting coil and protect it.

18 Claims, 10 Drawing Sheets

SUPERCONDUCTING MAGNET ABNORMALITY DETECTION AND PROTECTION APPARATUS

BACKGROUND OF THE INVENTION

The present invention relates to a superconducting magnet abnormality detection apparatus used in ultrahigh speed electromagnetic levitation type trains or the like running at high speed by using electromagnetic levitative force.

As electromagnetic levitation type trains using superconducting magnets, various schemes have been devised. In a practical scheme, levitation ground coils for levitating train bodies and propulsion ground coils for propelling the train bodies are laid down on the track plane of the ground side whereas superconducting magnets are mounted on trains.

FIGS. 2 and 3 are schematic sectional views showing arrangement of coils on superconducting electromagnetic levitation type trains of the prior art. In each of the drawings, a vehicle 80 and a truck 5 mounted under the vehicle 80 are placed in a U-shaped track 81, which surrounds the vehicle 80 and truck 5 at the bottom and on both lateral sides. On both sides of the truck 5, superconducting magnets 1 are arranged at fixed pitches so that S poles and N poles may appear alternately in the running direction of the vehicle 80. Typically, superconducting coils 2 of the superconducting magnets 1 are cooled to extremely low temperature and kept at low temperature. Therefore, each superconducting coil 2 is installed in a vacuum container 3 (hereafter referred to as outer vessel) made of a non-magnetic material, and held so that heat may not penetrate therein from the outside. As shown in FIGS. 2 and 3, superconducting coils 2 housed in the outer vessels 3 of the superconducting magnets 1 and held by load supports 4 are so disposed as to be opposite to both side faces of the track 81. Paying our attention to ground coils for levitating the vehicle 80, it is understood that the ground coils 92 are placed on the horizontal plane of the track 81 in FIG. 3, whereas in FIG. 2 the superconducting coils 2 and the levitation ground coils 90 are respectively disposed on side faces of the truck 5 and the track 81 so as to be opposite to each other. Each of these ground coils 90 shown in FIG. 2 takes such a shape that an upper rectangular coil and a lower rectangular coil are coupled and short-circuited to form a character "8". On the other hand, propulsion ground coils 91 are attached to side walls of the track 81 as shown in FIGS. 2 and 3, and excited by a three-phase AC power source, which is not illustrated, to generate propulsive force in the superconducting coils 2. The superconducting coils 2 generate DC magnetic fields each having a high magnetic flux density and linkage with the levitation ground coils 90 or 92. As the vehicle 80 runs, the DC magnetic fields move. Therefore, the flux linkage with respect to the ground coils 90 or 92 changes. In each of the levitation ground coils 90 or 92 formed by short-circuit coils, a short-circuit current is induced so as to cancel the change in the flux linkage. Induction levitative force is generated between levitation ground coils 90 or 92 and the superconducting coils 2. The vehicle 80 is thus levitated without contact.

When the train is running at 500 kilometers per hour, a higher harmonic pulsating component exists in a magnetic field distribution generated by a current induced in each of the levitation coils 90 or 92. During running, therefore, a pulsating magnetic flux is always incident upon each of the superconducting magnets 1. Typically, each of the outer vessels 3 is made of a conductive material such as Al. By the incident higher harmonic pulsating magnetic flux, therefore, an eddy current flows in each of the outer vessels 3. Between the intense DC magnetic field generated by each of the superconducting coils 2 and this eddy current, electromagnetic force is generated. While the train is running, the electromagnetic force continues to vibrate the superconducting magnet 1. As for the track 81, the track face is made smooth as far as possible. However, the track face is not completely smooth. Furthermore, the coils 90, 91 and 92 attached to the track 81 also have unevenness caused by mounting errors. Therefore, the superconducting magnets 1 are subjected to vertical, lateral and rotational force and vibrate. Especially, the load supports 4 supporting the superconducting coils 2 are always subjected to these vibrations during running.

If any one of the load supports 4 breaks down, the associated superconducting coil 2 loses its support and large vibration is caused. In some cases, the levitative force and the propulsive force cannot be propagated to the truck 5, resulting in a fear of being unable to run. Therefore, it has been considered to measure vibration and strain by attaching acceleration sensors or strain gauges to superconducting magnets 1 and monitor the vibration and strain during running.

Furthermore, it is possible that the superconducting magnets 1 transfer from the superconducting state to the normal conducting state under the influence of the above described vibration and pulsating magnetic flux. If one of superconducting magnets disposed on one side of the truck 5 transfers to the normal conducting state, the number of normal superconducting magnets 1 mounted on one side of the truck 5 differs from the number of normal superconducting magnets 1 mounted on the other side of the truck 5. Therefore, the levitative force and propulsive force exercised upon the truck 5 on one side differs from those on the other side. If the truck 5 continues to run in an unbalance state, abnormal force is applied to the truck 5. In the worst case, there is a fear of contact of a magnet 1 with the side wall of the track 81. Therefore, it has been considered to attach instrumentation lines for voltage detection to the superconducting coils 2 and detect voltage generated when a magnet 1 has transferred to the normal conducting state.

In order to early detect crack or failure caused in the load supports 4, a large number of acceleration sensors or strain gauges are attached to the superconducting magnets 1 in the prior art. The acceleration sensors and strain gauges measure acceleration and strain caused at points where they are attached. For monitoring the vibration of the entire superconducting coil 2, therefore, it is necessary to dispose a large number of sensors beforehand in locations where abnormality is supposed to tend to occur.

In case a large number of sensors are mounted, however, reliability of the sensors must be sufficiently high. Furthermore, for accurately measuring the vibration of the superconducting coils 2 and voltage generated at the time of transfer to the normal conducting state, sensors must be directly attached to the coils 2. Heat is conducted from the outside via the instrumentation line or power supply line. The amount of consumption of liquid helium for cooling the superconducting coils 2 has thus increased.

Furthermore, in case a superconducting coil 2 has transferred from the superconducting state to the normal conducting state, there is a possibility of occurrence of high voltage on an instrumentation line for voltage detection. Therefore, there is a fear of eventual dielectric breakdown of the instrumentation line or fault of a monitoring device.

SUMMARY OF THE INVENTION

In view of the above described points, the present invention has been made. Therefore, one object of the present invention is to provide a superconducting magnet abnormality detection and protection apparatus for early detecting an abnormality in superconducting coils by detecting magnitudes of vibration and displacement of coils and always monitoring these signals without being in contact with the superconducting coils to prevent penetration of heat from the outside.

Another object of the present invention is to provide an abnormality detection and protection apparatus for early detecting an abnormality of coils and specifying the location of occurrence of the abnormality without being in contact with the superconducting coils.

Another object of the present invention is to provide an abnormality detection and protection apparatus for early and surely detecting an abnormality of transfer of coils from the superconducting state to the normal conducting state without being in contact with the superconducting coils so as to prevent penetration of heat from the outside.

Another object of the present invention is to provide a superconducting magnet abnormality detection and protection apparatus, responsive to detection of an abnormality in a superconducting magnet, for surely interrupting the current of the abnormal superconducting coil and thereby avoiding the development of the abnormality.

Another object of the present invention is to provide a superconducting magnet abnormality detection and protection apparatus, responsive to detection of an abnormality in a superconducting magnet, for surely interrupting both the current of the abnormal superconducting coil and the current of a superconducting coil located on the truck so as to be opposite to the abnormal superconducting coil and thereby avoiding an abnormal movement of the vehicle and the development of the abnormality.

In order to achieve the above described objects, a magnetic flux detecting device is attached inside an outer vessel, which is a vacuum container of a superconducting magnet, so as to be opposite to a superconducting coil, and it is detected whether an abnormality is present or not by detecting voltage induced in the device and monitoring the change of the voltage with time, the magnet being thus protected.

Magnetic flux detecting devices are attached inside outer vessels of a plurality of superconducting magnets so as to be opposite to the superconducting coils, and it is detected whether an abnormality is present or not by comparing voltages induced in devices attached to these superconducting magnets and monitoring the magnitude of difference between voltages, the magnets being thus protected.

Magnetic flux detecting devices are attached inside outer vessels of a plurality of superconducting magnets so as to be opposite to the superconducting coils, and voltages induced in devices attached to these superconducting magnets are compared with each other or the voltage at the time of normal running is compared with the current device voltage to monitor the magnitude of difference between voltages. When an abnormality has occurred, a superconducting magnet having the same vibration direction is subjected to demagnetization and protected.

As a magnetic flux detecting device, there is a search coil produced by winding conductors such as enameled wire. The magnitude of voltage induced in this search coil is proportionate to the magnitude of relative movement or displacement between the outer vessel of the magnet whereto the search coil is attached and the superconducting coil. When the load support supporting a superconducting coil breaks down, a large relative displacement occurs between the outer vessel and the superconducting coil and hence a large voltage is induced in the search coil. Furthermore, even when the superconducting coil transfers from the superconducting state to the normal conducting state, a voltage proportionate to attenuation of the current of the superconducting coil is induced in the search coil. By using them, the voltage of the search coil continues to be always monitored. When it has been detected that the voltage has become large suddenly or the signal continues to increase with time, it can be determined that some abnormality has occurred in the superconducting coil.

For example, a plurality of superconducting magnets are attached to a truck of a levitation type train. Therefore, it may be determined whether an abnormality is present or not by comparing the voltage induced in a search coil attached to a certain superconducting magnet with voltage induced in a search coil of another superconducting coil.

In case the load support of a superconducting coil has broken down locally, large vibration occurs partially or a peculiar way of vibration occurs. In case a plurality of search coils are attached to a superconducting coil, large voltage is generated in the search coils so as to correspond to the way of vibration of the superconducting coil. As a result, the location of breakdown can be identified.

DESCRIPTION OF THE PREFERRED EMBODIMENTS

On the basis of illustrated embodiments, the present invention will hereafter be described.

Figure 13:
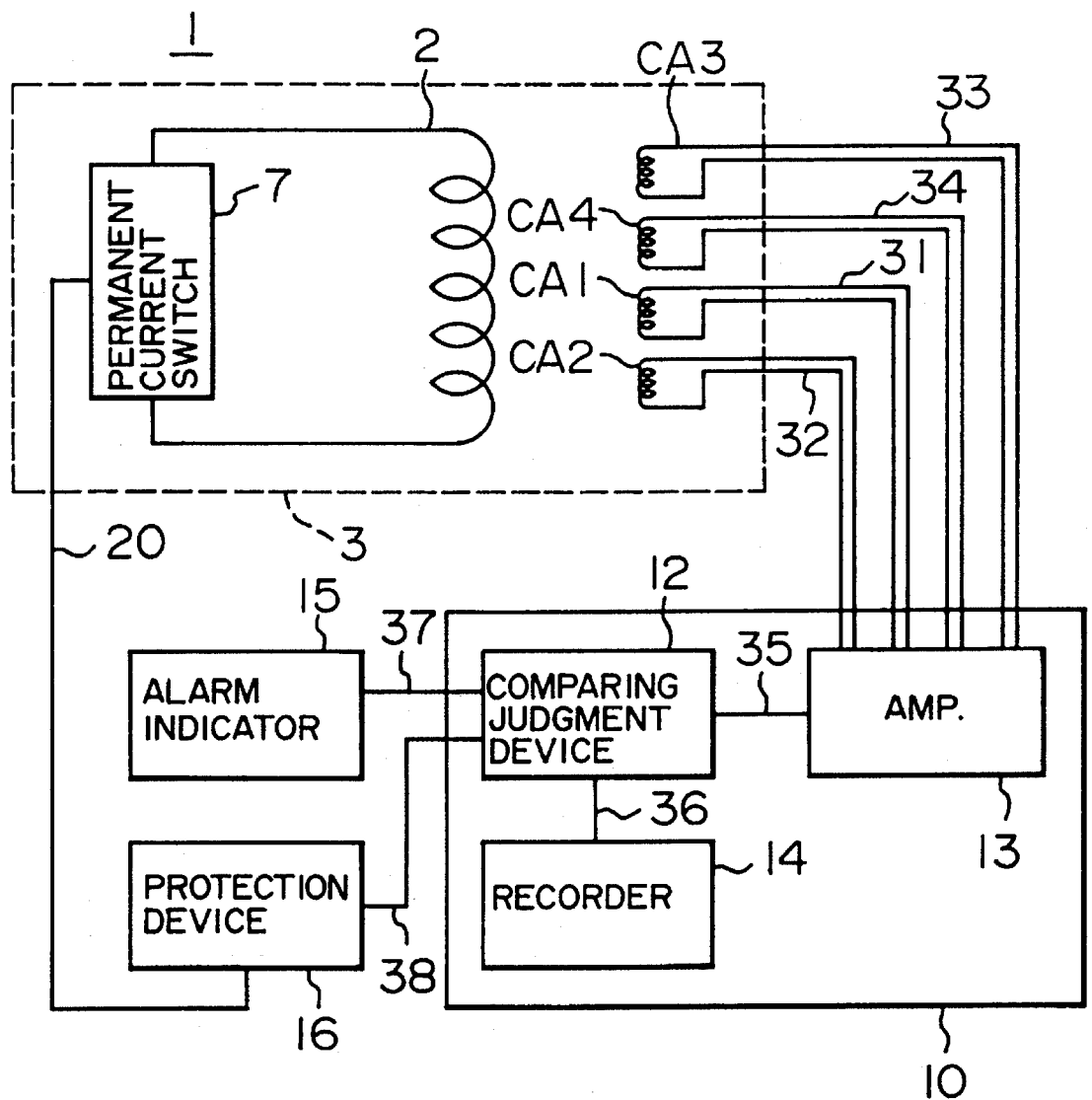
FIG. 13 is an electric circuit diagram showing a superconducting magnet abnormality detection and protection apparatus for superconducting electromagnetic levitation type train according to the present invention, which determines whether an abnormality is present on the basis of a past device signal and a current signal.

FIGS. 1A and 1B show shows an embodiment of the present invention. In a superconducting magnet 1 installed on a truck 5 of a vehicle 80, a current flowing through a superconducting coil 2 held by load supports 4 flows through a permanent current switch 7 via superconducting lines 21 and 22. The current of the superconducting coil is conducted or interrupted by the permanent current switch 7. Within an outer vessel 3 of the superconducting magnet 1, four search coils CA1, CA2, CA3 and CA4 made by winding conductors are disposed as magnetic flux detection devices. As illustrated, the search coils CA1 to CA4 are disposed on the side of the truck 5. Voltage signals induced in the search coils are transmitted to a decision device 10 via signal lines 31, 32, 33 and 34 to determine whether an abnormality is present. FIG. 13 is an electric circuit diagram how the superconducting magnet, the search coils, and the abnormality detection and protection apparatus are electrically connected.

The reason why the search coils CA1 to CA4 are mounted inside the outer vessel 3 will hereafter be described. If the pulsating frequency of magnetic flux based upon the relative displacement between the superconducting coil and the outer vessel is at least 100 Hz, eddy currents flowing in the outer vessel made of a conductive material mainly concentrate in the inside surface. The pulsating magnetic flux formed by the eddy currents and the pulsating magnetic flux based upon the relative displacement cancel each other, and the pulsating magnetic flux leaking out to the outside of the outer vessel becomes very small. In case search coils are disposed outside the outer vessel, therefore, it becomes difficult to detect a change in magnetic flux based upon a relative displacement between the superconducting coil and the outer vessel.

If search coils are disposed outside the outer vessel, the search coils are susceptible to influence of noise and it is very difficult to accurately detect a signal based upon the pulsating magnetic flux. Inside the outer vessel, however, noise is screened by the outer vessel made of a conductive material. Signals of search coils disposed inside contain little noise.

Furthermore, the reason why the search coils CA1 to CA4 are mounted on the side of the truck 5 will hereafter be described. Pulsating magnetic flux generated by ground coils 90, 91 and 92 laid down on the track 81 as described before is incident on the side of the ground coil of the superconducting magnet 1. This magnetic flux is screened by the outer vessel 3 made of Al. However, a part of magnetic flux penetrates into the inside of the magnet 1. In case the search coils CA1 to CA4 are mounted on the grounding coil side of the inside of the outer vessel 3, voltage is induced in the search coils by pulsating magnetic flux penetrating into the inside of the magnet 1 and hence it is difficult to accurately detect voltage based upon relative vibration between the outer vessel 3 and the superconducting coil 2. On the other hand, in case the search coils CA1 to CA4 are mounted on the truck side of the inside of the outer vessel 3, pulsating magnetic flux generated by the ground coils 90, 91 and 92 becomes sufficiently small in the mounting positions and hence vibration of the superconducting coil 2 can be accurately detected.

The area of each of the search coils CA1, CA2, CA3 and CA4 is equivalent to approximately one fourth of that of the superconducting coil 2. The DC magnetic flux generated by the superconducting coil 2 has linkage with the search coils. In case a load support 4a1 for supporting the superconducting coil 2 has broken down, a part of the superconducting coil supported by the load support 4a1 vibrates and hence the flux linkage with respect to the search coil CA1 opposite to the load support 4a1 largely changes. When the load support 4a1 has broken down, therefore, the voltage induced in this search coil CA1 becomes especially large as compared to voltages induced in other search coils CA2, CA3, and CA4.

Figure 1:
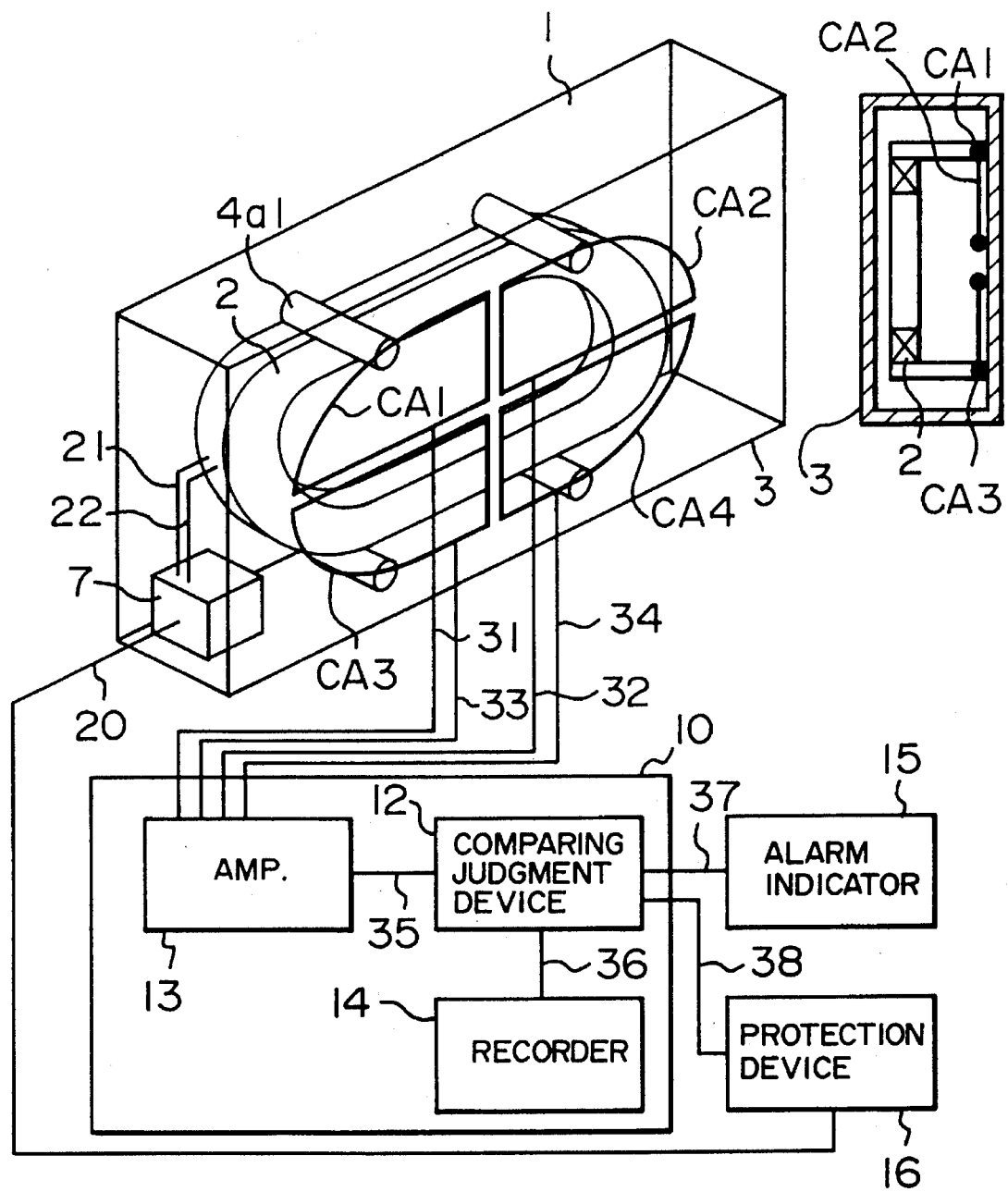
FIG. 1A is a block diagram showing a superconducting magnet abnormality detection and protection apparatus for superconducting electromagnetic levitation type train according to the present invention, which determines whether an abnormality is present on the basis of a past device signal and a current signal.
FIG. 1B shows a cross-section of the superconducting magnet.
Figure 2:
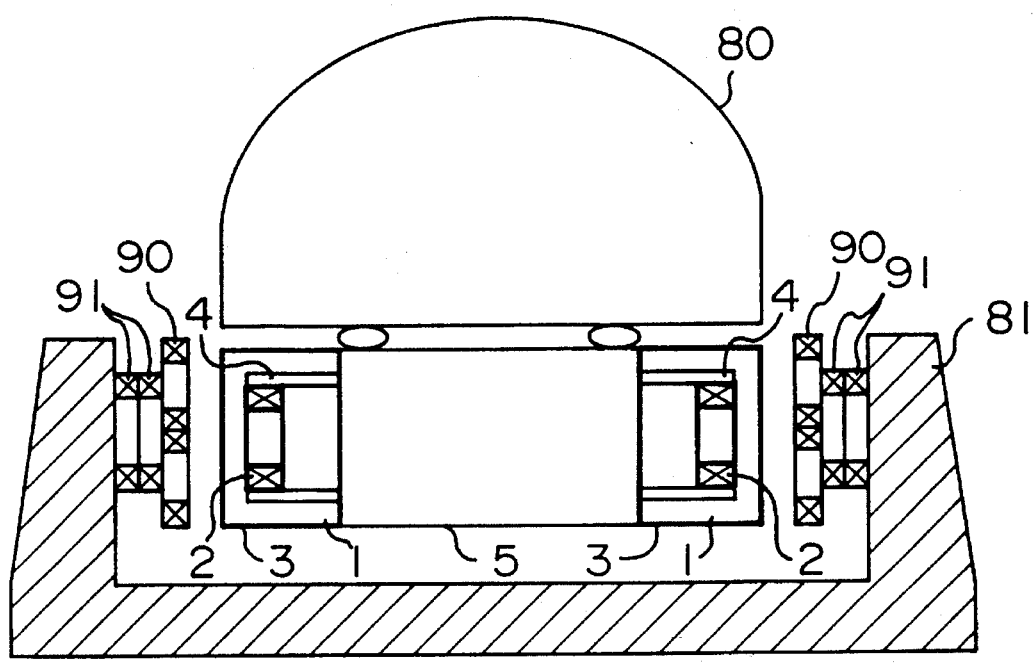
FIG. 2 is a sectional view showing arrangement of various coils of a superconducting electromagnetic levitation type train for which ground coils are laid down on side walls of a track.
Figure 3:
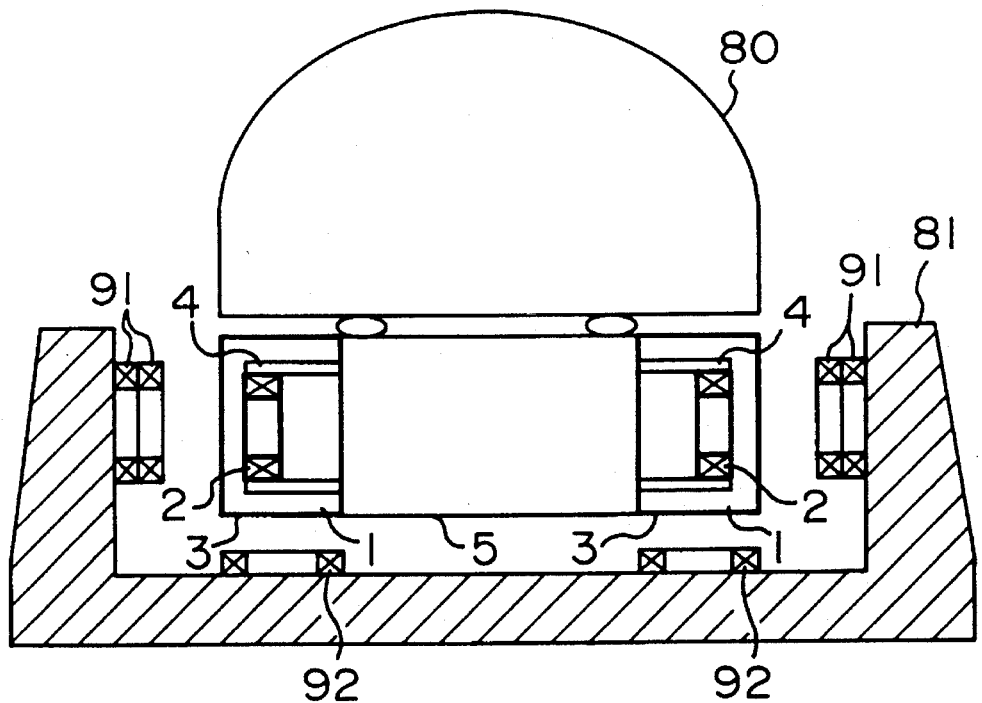
FIG. 3 is a sectional view showing arrangement of various coils of a superconducting electromagnetic levitation type train for which ground coils are laid down on side walls and floor of a track.

In the block diagram of FIG. 1, a decision device 10 for automatically monitoring all the time whether an abnormality is present, an alarm indicator 15 for informing of an abnormal state on the basis of an output signal of the decision device 10, and a protection device 16 for protecting the superconducting magnet 1 are shown. Voltage signals induced in the search coils CA1 to CA4 are sent to an amplifier 13 via signal lines 31, 32, 33 and 34 and amplified therein. The amplified signal is sent to a comparing judgment device 12 included in the decision device 10 via a signal line 35. Voltages v1 induced in the search coils and amplified by the amplifier 13 are inputted to the comparing judgment device 12 one after another. Voltages v2 induced in the search coils at the time of past normal running and stored in a recorder 14 beforehand are inputted to the comparing judgment device 12 one after another via a signal line 36. The voltage v1 is compared with the voltage v2. When the difference |v1–v2| has exceeded a preset voltage level V0, it is decided that an abnormality is present. When it is decided that an abnormality is present, the difference voltage |v1−v2| is compared with a voltage level V1, which has been set to have a larger value than that of the voltage level V0, to determine |v1−v2| is larger than V1. This voltage level V1 is a permissible limit value for vibration of the superconducting coil 2. When the difference voltage |v1−v2| has exceeded V1, the superconducting coil 2 is very dangerous and the superconducting magnet 1 is likely to lead to breakdown. When the difference voltage has exceeded V1, therefore, such a protection measure as to demagnetize the superconducting magnet 1 having a sensed abnormality and suppress the vibration of the superconducting magnet 1 is taken. When the difference voltage has exceeded V1, a signal indicating occurrence of a serious abnormality is sent to the protection device 16 via a signal line 38. On the basis of the signal on the signal line 38, the protection device 16 sends a signal for demagnetizing the superconducting magnet 1 to the permanent current switch 7 installed in the superconducting magnet 1 via a signal line 20. On the basis of this signal, the permanent current switch 7 interrupts the current flowing through superconducting lines 21 and 22. When the difference voltage is between V0 and V1, a decision is made as to which search coil voltage has become abnormal and an alarm signal indicating occurrence of an abnormality and a signal indicating the location of occurrence of the abnormality are sent to the alarm indicator 15 via a signal line 37. The alarm indicator 15 informs of abnormality detection by means of a lamp, buzzer, CRT or the like, and displays the location of abnormality occurrence and the degree of the abnormality.

Figure 14:
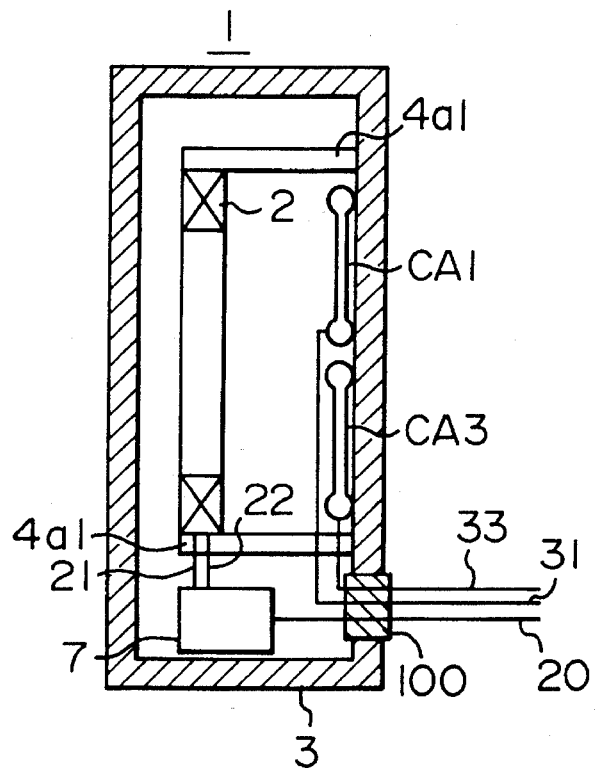
FIG. 14 is a sectional view showing signal lines of devices and a permanent current switch, which are pulled out from the inside of a superconducting magnet to the outside.

The signal line 20 for sending a signal for demagnetizing the superconducting magnet 1 to the permanent current switch 7 and the signal lines 31, 32, 33 and 34 respectively of the magnetic flux detecting search coils CA1, CA2, CA3 and CA4 are pulled out from the inside of the magnet to the outside via a vacuum seal 100 disposed in the superconducting magnet 1 as shown in FIG. 14.

Figure 15:
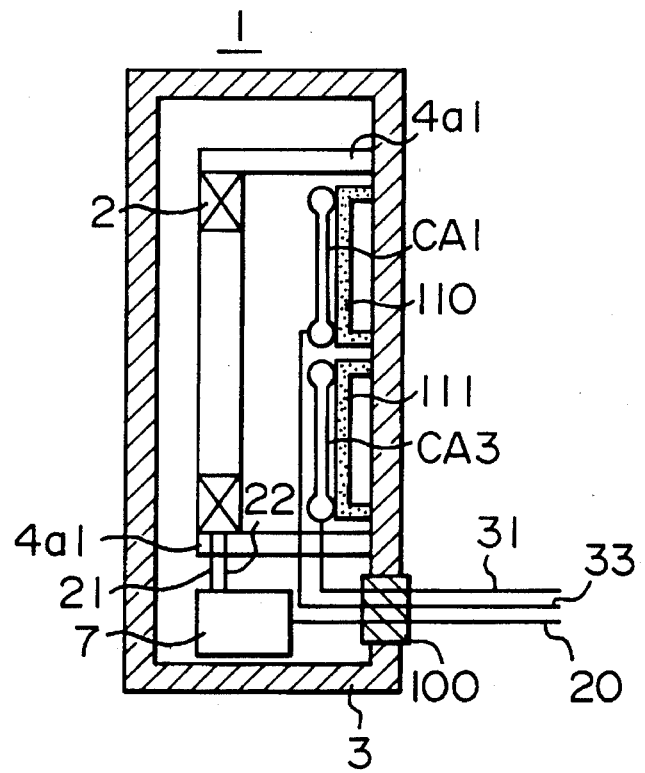
FIG. 15 is a sectional view showing how magnetic flux detecting devices are attached to jigs, which are in turn fixed to an outer vessel of a superconducting magnet.

Instead of being installed inside the outer vessel 3 of the superconducting magnet as shown in FIG. 14, the search coils may be mounted on jigs 110 and 111, which are in turn fixed to the outer vessel 3 as shown in FIG. 15. If such jigs are used, the relative displacement between the magnet and the outer vessel can be detected with the highest sensitivity by appropriately choosing the space between the superconducting magnet and the outer vessel.

Figure 4:
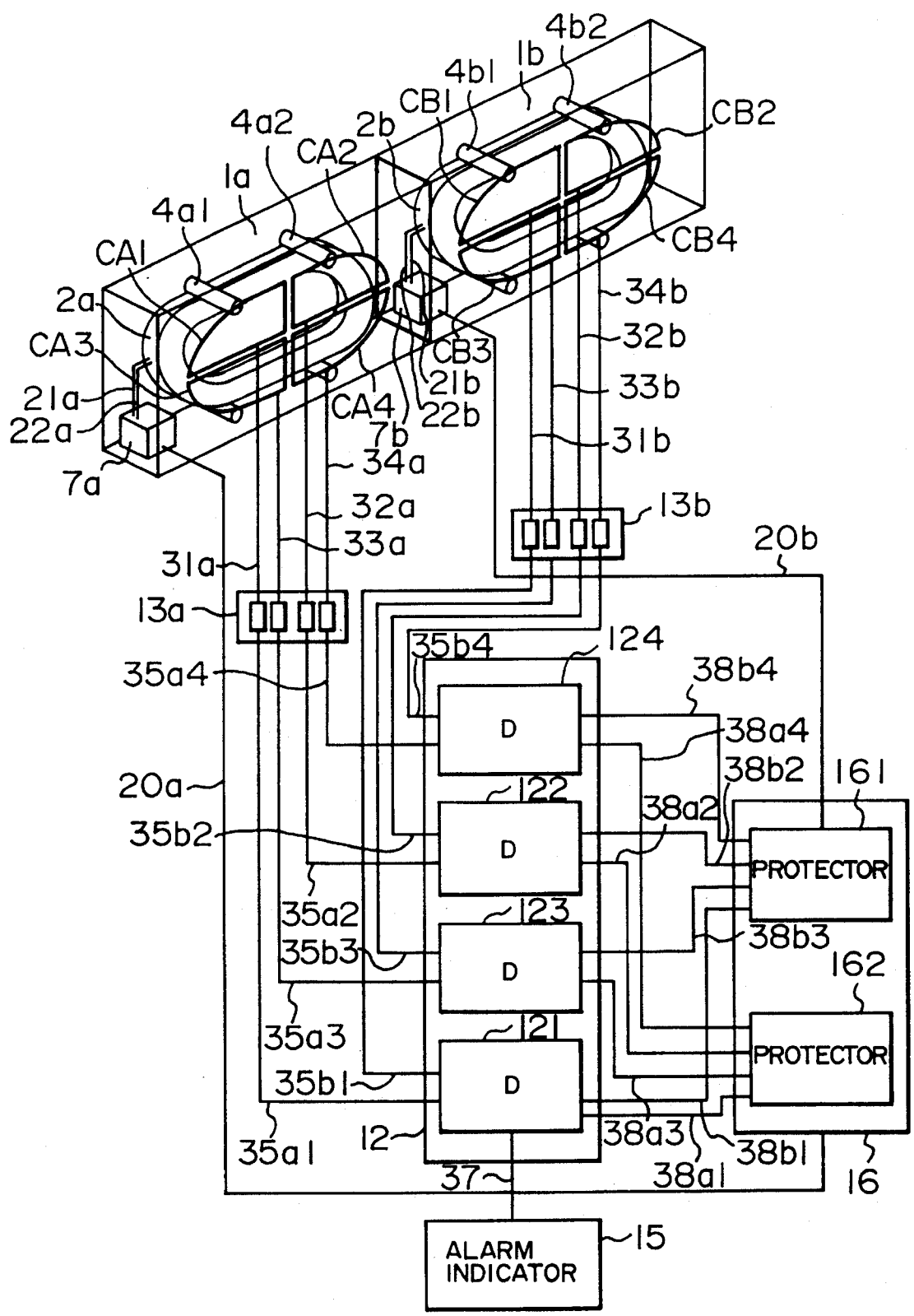
FIG. 4 is a block diagram showing a superconducting magnet abnormality detection and protection apparatus for superconducting electromagnetic levitation type train, which determines whether an abnormality is present on the basis of signals of a plurality of devices located in different positions in the running direction.

FIG. 4 shows another embodiment of the present invention. In the present embodiment, signals of the search coils attached to a plurality of superconducting magnets are taken in to determine whether an abnormality is present.

As shown in FIG. 4, four search coils are attached to each of two superconducting magnets 1a and 1b having different positions in the running direction. Voltages induced in search coils which can be regarded as the same in electromagnetic condition, such as voltage in a search coil CA1 and voltage in a search coil CB1, are compared. In case a load support 4a1 located near the search coil CA1 has broken down, voltage induced in the search coil CA1 becomes much larger than that induced in the search coil CB1 and hence the abnormality can be detected quickly. Therefore, an abnormality detection and protection apparatus has the following configuration. Voltages induced in the search coils CA1 to CA4 attached to the superconducting magnet 1a are sent to an amplifier 13a via signal lines 31a, 32a, 33a and 34a and amplified there. Voltage signals are taken in a successively comparing judgment device 12 via signal lines 35a1, 35a2, 35a3 and 35a4. In the same way, voltages induced in the search coils CB1 to CB4 attached to the superconducting magnet 1b are also sent to an amplifier 13b via signal lines 31b, 32b, 33b and 34b and amplified there. Voltage signals are sent to the successively comparing judgment device 12 via signal lines 35b1, 3562, 3563 and 3564. Voltage signals detected by CA1 and CB1 and sent are compared by a device 121 included in the comparing judgment device 12 to determine whether the magnitude of difference between voltages has exceeded a voltage level V0 or V1. If the voltage difference is between V0 and V1, a signal indicating the location of occurrence of the abnormality and an alarm signal are sent to an alarm indicator 15 via a signal line 37. If the voltage difference has exceeded V1, protection processing for demagnetizing a superconducting magnet having an abnormally increased search coil voltage is conducted. That is to say, a protection signal is sent to a protection device 16 via a signal line 38a4 or 38b4. A protector 161 or 162 sends an interruption signal to a permanent current switch 7b or 7a via a signal line 20b or 20a to interrupt the current of the superconducting magnet 1b or 1a in which an abnormality has occurred. In the same way, voltage signals of the search coils CA2, CA3 and CA4 are respectively compared in comparing judgment devices 122, 123 and 124 with voltage signals of the search coils CB2, CB3 and CB4. A series of processing, such as decision as to whether an abnormality is present or not, which is identical with the processing for CA1 and CB1 is conducted.

The abnormality detection and protection apparatus having this configuration can be simply constructed without needing the recorder 14.

Figure 5:
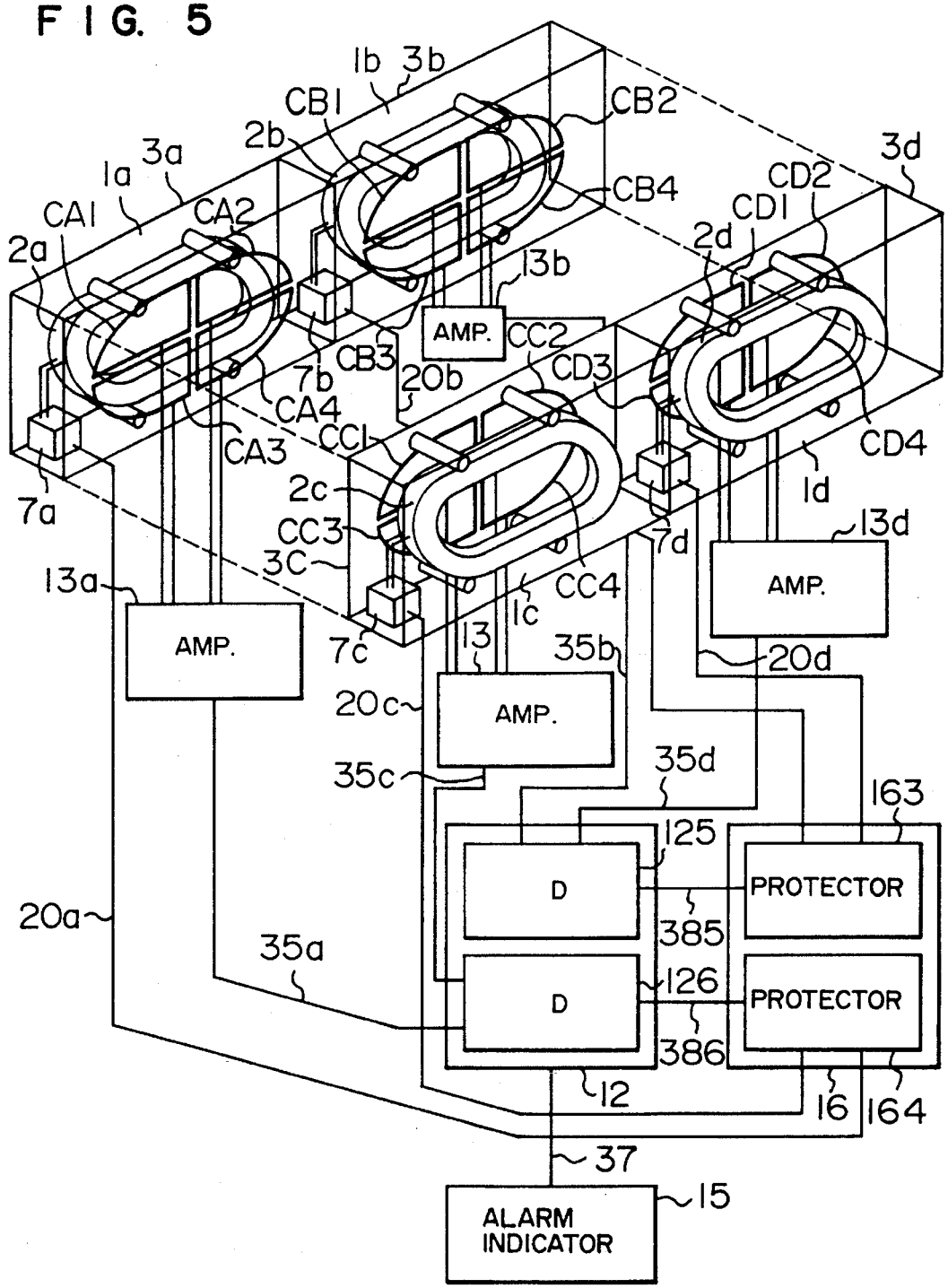
FIG. 5 is a block diagram showing a superconducting magnet abnormality detection and protection apparatus for superconducting electromagnetic levitation type train, which determines whether an abnormality is present on the basis of signals of devices attached to opposite magnets of the truck located in the same position in the running direction.

FIG. 5 shows another embodiment of the present invention. In the present embodiment, search coils are attached to a plurality of superconducting magnets disposed on both sides of the truck and signals of these search coils are taken in to determine whether an abnormality is present.

Among superconducting magnets mounted on both sides of a truck as shown in FIG. 5, two superconducting magnets having electromagnetic conditions which can be regarded as identical, such as 1a and 1b having the same position in the running direction of the truck, are paired. Voltages induced in search coils attached to respective magnets are successively compared to determine whether there is an abnormality.

An abnormality detection and protection apparatus has the following configuration. Induction voltages detected by magnetic flux detecting search coils CA1 to CA4, CB1 to CB4, CC1 to CC4, and CD1 to CD4 respectively attached to superconducting magnets 1a, 1b, 1c and 1d are respectively amplified by amplifiers 13a, 13b, 13c and 13d, and sent to a comparing judgment device 12 via signal lines 35a, 35b, 35c and 35d, respectively. A device 126 in the comparing judgment device 12 compares voltages induced in search coils CA1 and CC1 respectively attached to the superconducting magnets 1a and 1c to determine whether the magnitude of difference between both voltages exceeds a voltage level V0 or V1. If the voltage difference is between V0 and V1, a signal indicating the location of occurrence of the abnormality and an alarm signal are sent to an alarm indicator 15 via a signal line 37. If the voltage difference has exceeded V1, a protection signal is sent to a protector 164 included in a protection device 16 via a signal line 386 to demagnetize both superconducting magnets. The protector 164 sends interruption signals to permanent current switches 7c and 7a respectively via signal lines 20c and 20a to interrupt currents of the superconducting magnets 1c and 1a. In the same way, voltage signals of the search coils CA2, CA3 and CA4 are respectively compared in the comparing judgment device 126 with voltage signals of the search coils CC2, CC3 and CC4. A series of processing, such as decision as to whether an abnormality is present or not, which is identical with the processing for CA1 and CC1 is conducted.

If one of the superconducting magnets 1a and 1c has transferred from the superconducting state to the normal conducting state, large voltages are induced in search coils attached to the superconducting magnet which has transferred. If the superconducting magnet 1a, for example, has transferred, voltages are induced in the search coils CA1, CA2, CA3 and CA4. The device 126 included in the comparing judgment device 12 compares voltages induced in search coils attached to the superconducting magnets 1a and 1c to determine whether magnitudes of voltages of the four coils become uniformly large and each difference voltage exceeds the voltage level V2. If the difference voltage has exceeded V2, a protection signal is sent to the protector 164 included in the protection device 16 via the signal line 386 to demagnetize both superconducting magnets. The protector 164 sends interruption signals to permanent current switches 7c and 7a respectively via signal lines 20c and 20a to interrupt currents of the superconducting magnets 1c and 1a.

For the superconducting magnets 1b and 1d as well, processing similar to that for the superconducting magnets 1a and 1c is conducted. Voltages induced in search coils attached to the superconducting magnets 1b and 1d are compared by a device 125 included in the comparing judgment device 12 to make a decision upon the magnitude of difference between both voltages. If the voltage difference has exceeded V1, a protection signal is sent to a protector 163 via a signal line 385. The protector 163 sends interruption signals to permanent current switches 7d and 7b respectively via signal lines 20d and 20b to interrupt currents of the superconducting magnets 1d and 1b.

In accordance with the present invention, it is determined whether an abnormality is present, on the basis of voltages induced in search coils, which are located in positions having the same electromagnetic condition. Therefore, the decision becomes sure, and it becomes possible to construct a highly reliable abnormality detection and protection apparatus free from a wrong decision.

Figure 12:
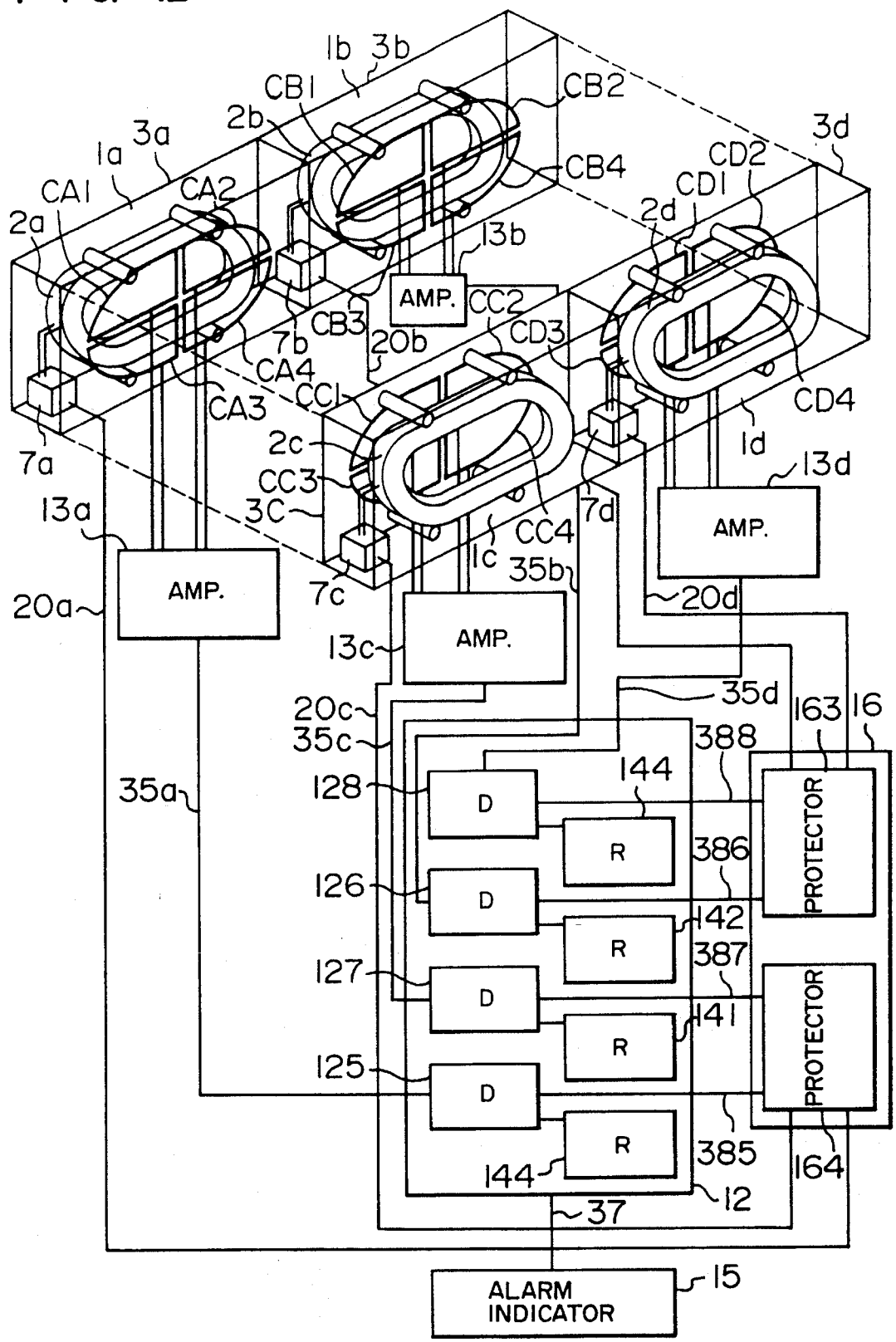
FIG. 12 is a block diagram showing a superconducting magnet abnormality detection and protection apparatus for superconducting electromagnetic levitation type train, which determines whether an abnormality is present in opposite magnets of the truck located in the same position in the running direction, on the basis of signals of devices at the time of normal running and which thus gives protection.

FIG. 12 shows another embodiment of the present invention. In the present embodiment as well, signals of search coils attached to a plurality of superconducting magnets disposed on both sides of the truck are taken in and processed to determine whether an abnormality is present in the same way as FIG. 5.

An abnormality detection and protection apparatus of FIG. 12 differs from the apparatus of FIG. 5 in configuration of the comparing judgment device 12. Induction voltages detected by magnetic flux detecting search coils CA1 to CA4, CB1 to CB4, CC1 to CC4, and CD1 to CD4 respectively attached to superconducting magnets 1a, 1b, 1c and 1d are respectively amplified by amplifiers 13a, 13b, 13c and 13d, and sent to a comparing judgment device 12 via signal lines 35a, 35b, 35c and 35d, respectively. For example, voltages induced in the search coils CA1 to CA4 are successively inputted to a device 125 included in the comparing judgment device 12 and compared with induction voltages of the search coils at the time of normal running stored in a recorder 141. It is thus determined whether the magnitude of difference between both voltages exceeds a voltage level V0 or V1. If the voltage difference is between V0 and V1, a signal indicating the location of occurrence of the abnormality and an alarm signal are sent to an alarm indicator 15 via a signal line 37. If the voltage difference has exceeded V1, a protection signal is sent to a protector 164 included in a protection device 16 via a signal line 385 to demagnetize both superconducting magnets. The protector 164 sends interruption signals to permanent current switches 7c and 7a respectively via signal lines 20c and 20a to interrupt currents of the superconducting magnets 1c and 1a. In the same way, voltage signals of the search coils CB1 to CB4, CC1 to CC4, and CD1 to CD4 are subjected to decision as to whether an abnormality is present by using comparing judgment devices 126, 127 and 128 and recorders 142, 143 and 144.

If a superconducting magnet has transferred from the superconducting state to the normal conducting state, large voltages are induced in all search coils attached to the superconducting magnet which has transferred in the same way as FIG. 5. The devices 125, 126, 127 and 128 included in the comparing judgment device 12 compare voltages induced in search coils attached to the superconducting magnets with induction voltages at the time of normal running stored in recorders 141, 142, 143 and 144 to determine whether magnitudes of voltages of the four coils attached to a certain superconducting magnet become uniformly large and each difference voltage exceeds the voltage level V2. If the difference voltage has exceeded V2, the comparing judgment device sends a protection signal to the protector 163 or 164 included in the protection device 16 via a signal line 385, 386, 387 or 388 to demagnetize both superconducting magnets symmetrically located on opposite sides of the truck. The protection device 16 sends interruption signals to permanent current switches via signal lines to interrupt currents of these superconducting magnets.

In accordance with the present invention, each of voltages induced in search coils of superconducting magnets is compared with its voltage at the time of normal running to determine whether there is an abnormality. Therefore, it is possible to construct an abnormality detection and protection apparatus capable of surely making a decision even if magnets located in symmetric positions of both sides of the truck become abnormal at the same time and free from a wrong decision.

Figure 6:
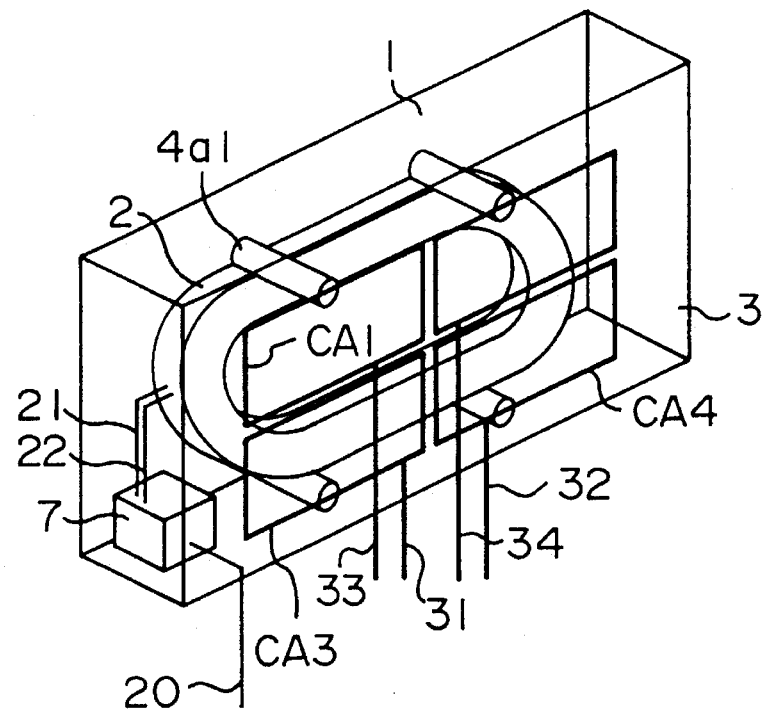
FIG. 6 is an oblique view of another embodiment of the present invention, in which rectangular devices are mounted on the truck side of the inside of an outer vessel of a superconducting magnet.

FIG. 6 shows another embodiment of the present invention. In the present embodiment, four rectangular search coils CA1 to CA4 are mounted inside an outer vessel 3 of a superconducting magnet 1 so as to be positioned on the side of the truck 5 and it is determined by the decision device 10 whether there is an abnormality on the basis of voltage signals induced in respective search coils. In the present embodiment, each search coil takes a rectangular shape and hence absence of circular arcs facilitates fabrication.

Figure 7:
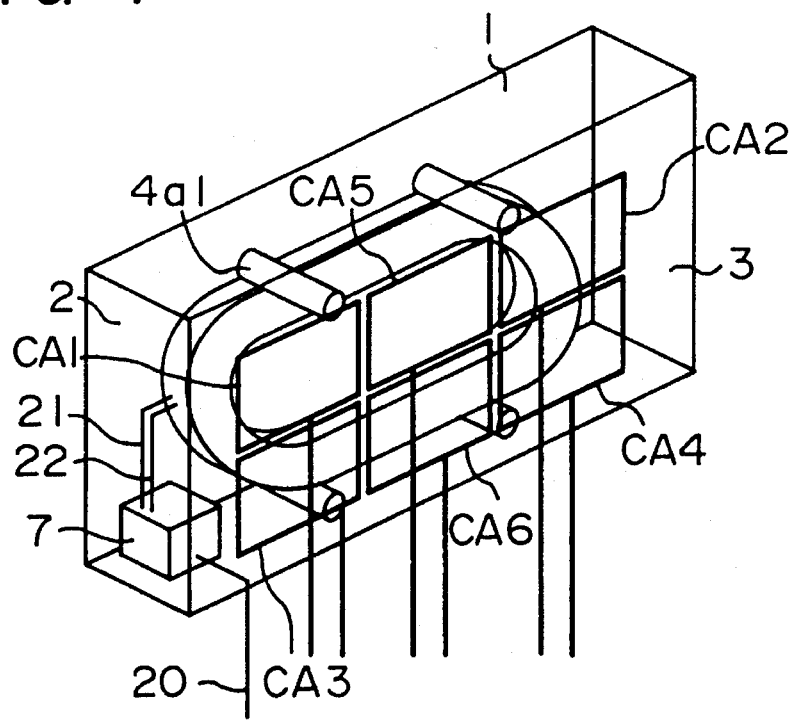
FIG. 7 is an oblique view of another embodiment of the present invention, in which a large number of rectangular devices are mounted on the truck side of the inside of an outer vessel of a superconducting magnet.

FIG. 7 shows another embodiment of the present invention. In the present embodiment, six search coils CA1 to CA6 are attached to one superconducting magnet 1 and it is determined by the decision device 10 whether there is an abnormality on the basis of voltage signals induced in respective search coils. When an abnormality is to be detected, an abnormal location can be specified by a smaller area as compared with the case where four search coils are mounted, owing to such a configuration. The number of mounted search coils can be increased at need.

Figure 8:
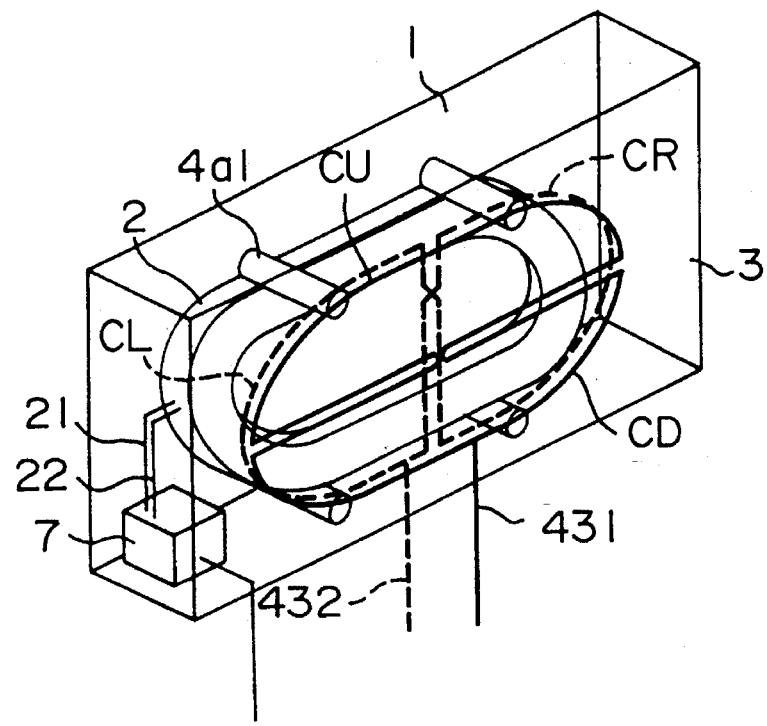
FIG. 8 is an oblique view of another embodiment of the present invention, in which devices for detecting a rolling movement and a yawing movement are mounted on the truck side of the inside of an outer vessel of a superconducting magnet.

FIG. 8 shows another embodiment of the present invention. In the present embodiment, wiring of search coils has been contrived. A search coil CU taking the shape of an upper half of a racetrack and a search coil CD taking the shape of a remaining lower half are wired so that voltages induced in the coils may cancel each other. In the same way, a search coil CL taking the shape of a left half of the racetrack and a search coil CR taking the shape of a right half of the racetrack are wired so as to form a letter "8". When the superconducting coil 2 conducts a rolling movement with respect to the outer vessel 3, voltage induced in the search coil CU formed by the upper half of the upper and lower search coils taking the shape of letter "8" and voltage induced in the search coil CD formed by the lower half have opposite signs. Therefore, voltages are added and a voltage appears on a signal line 431. On the other hand, a voltage does not appear in the left and right search coils taking the shape of letter "8". In the same way, a voltage appears on a signal line 432 of the left and right search coils taking the shape of letter "8" when the superconducting coil 2 conducts a yawing movement. If it is determined whether an abnormality is present by using voltages induced in the search coils thus wired, it is possible to know the way of vibration, i.e., whether the superconducting magnet 1 is conducting a yawing movement or a rolling movement when an abnormality has occurred.

Figure 9:
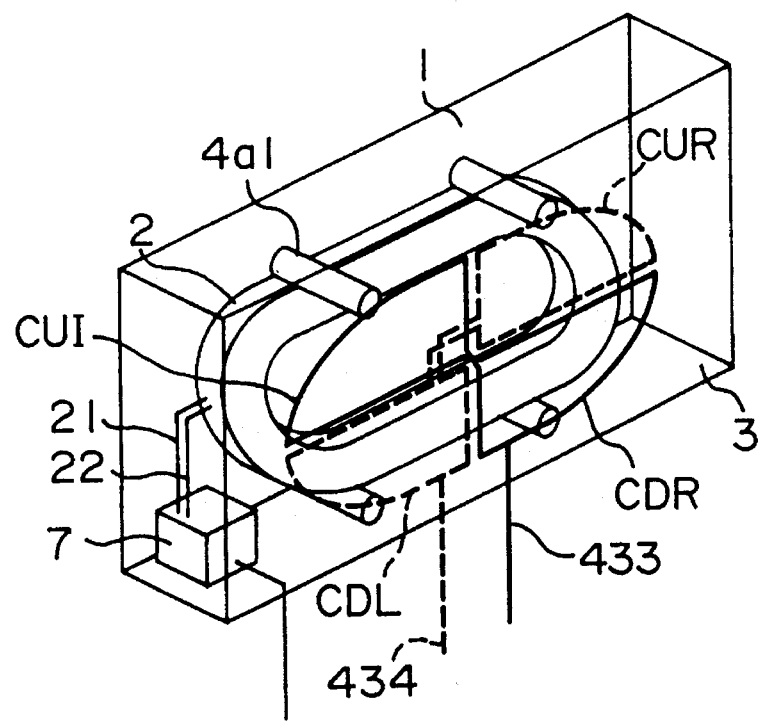
FIG. 9 is an oblique view of another embodiment of the present invention, in which devices for detecting a twisting movement is mounted on the truck side of the inside of an outer vessel of a superconducting magnet.

FIG. 9 shows another embodiment of the present invention. In the present embodiment as well, wiring of search coils has been contrived. A search coil CUL taking the shape of an upper left half of a racetrack and a search coil CDR taking the shape of a lower right half are wired so that voltages induced in the coils may cancel each other. In the same way, a search coil CDL taking the shape of a lower left half of the racetrack and a search coil CUR taking the shape of an upper right half of the racetrack are wired so as to form a letter "8". When the superconducting coil 2 conducts a twist movement with respect to the outer vessel 3, voltages induced in the upper search coils and voltages induced in the lower search coils have opposite signs. Therefore, voltages are added and voltages appear on signal lines 433 and 434. If it is determined whether an abnormality is present by using voltages induced in the search coils thus wired, it is possible to know what twist vibration the superconducting magnet 1 conducts when an abnormality has occurred.

Figure 10:
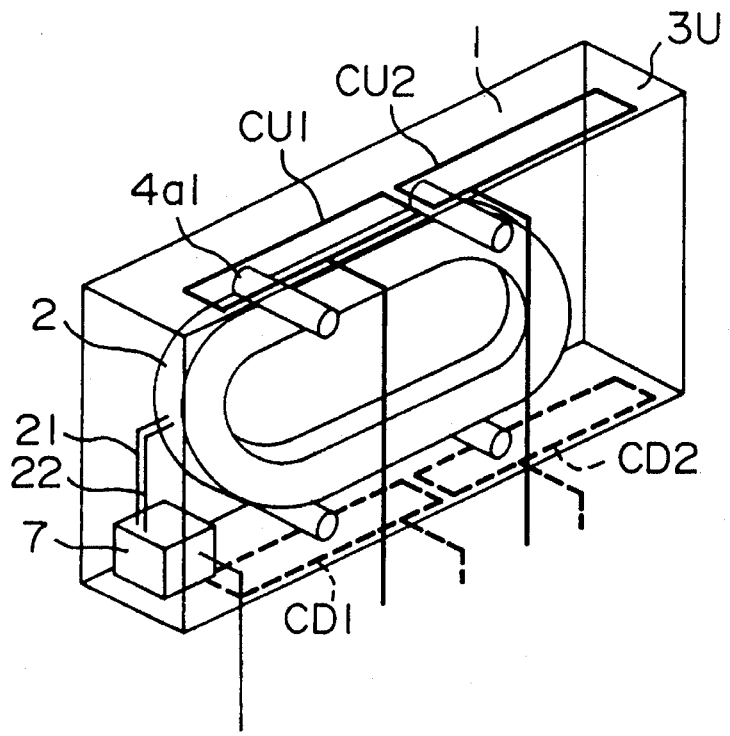
FIG. 10 is an oblique view of another embodiment of the present invention, in which devices are mounted on the upper face and lower face of the inside of an outer vessel of a superconducting magnet.

FIG. 10 shows another embodiment of the present invention. In the present embodiment, search coils are disposed on the upper face 3U and lower face 3D of the inside of the outer vessel 3 of the superconducting magnet 1. Particularly, two search coils CU1 and CU2 are disposed on the upper face and search coils CD1 and CD2 are disposed on the lower face. Large voltages appear in these search coils when the superconducting coil 2 conducts a vertical movement or a pitch movement with respect to the outer vessel 3. If it is determined whether an abnormality is present by using voltages induced in these search coils, it is possible to know abnormal vibration of the superconducting magnet 1 in the vertical direction with high sensitivity.

Figure 11:
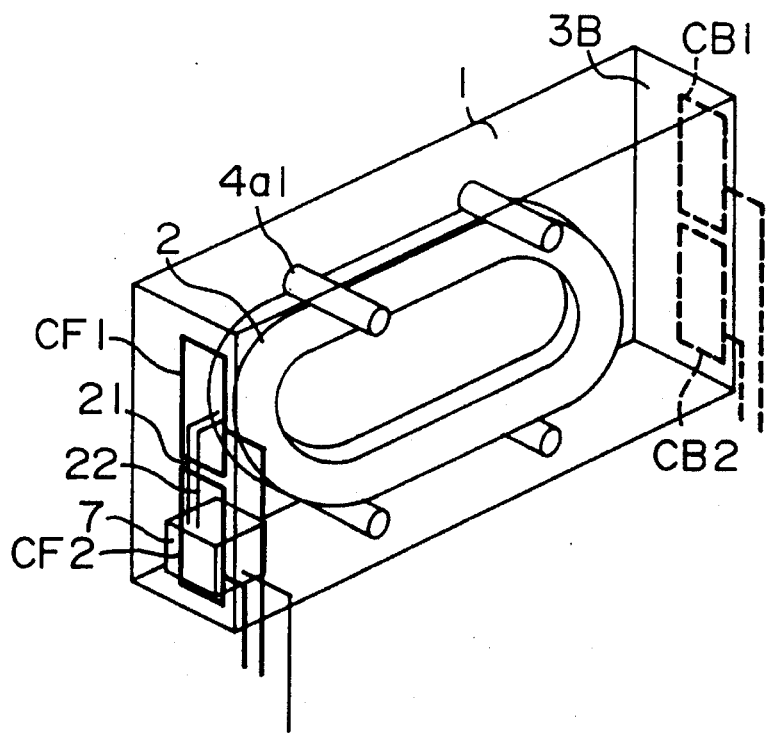
FIG. 11 is an oblique view of another embodiment of the present invention, in which devices are mounted on the front face and rear face of the inside of an outer vessel of a superconducting magnet in the running direction.

FIG. 11 shows another embodiment of the present invention. In the present embodiment, search coils are disposed on a front face 3F and a rear face 3B of the inside of the outer vessel 3 of the superconducting magnet 1 with respect to the running direction. Particularly, two search coils CF1 and CF2 are disposed on the front face and search coils CB1 and CB2 are disposed on the rear face as well. Large voltages appear in these search coils when the superconducting coil 2 conducts a movement in the running direction with respect to the outer vessel 3. If it is determined whether an abnormality is present by using voltages induced in these search coils, it is possible to know abnormal vibration of the superconducting magnet 1 in the running direction with high sensitivity.

In the foregoing description, search coils made by winding conductors such as enamel wires are used as magnetic flux detecting devices. However, Hall effect devices may also be used as means for detecting magnetic flux.

As heretofore described, the following effects can be expected from the present invention.

(1) Heat does not penetrate from the outside into the superconducting coil via instrumentation lead wires of magnetic flux detecting devices. Magnitudes of vibration and displacement of the superconducting coil can be detected without being in contact with the coil. By always monitoring these signals, it is possible to early detect and protect an abnormality of the superconducting coil and a location of occurrence of the abnormality.

(2) In detecting an abnormality, the location of the abnormality can be specified by a smaller area by increasing the number of search coils.

(3) It is possible to construct such a highly reliable abnormality detection and protection apparatus that heat does not penetrate from the outside into the superconducting coil via instrumentation lead wires of magnetic flux detecting devices and a decision can be made early and surely upon an abnormality of transfer of the coil to the normal conducting state without being in contact with the superconducting coil.

(4) When an abnormality has been detected, the current of the abnormal superconducting coil can be surely interrupted and development of the abnormality can be avoided.

(5) When an abnormality has been detected, the current of the abnormal superconducting coil can be surely interrupted and development of the abnormality can be avoided and a superconducting magnet having the same position in the running direction and located on the opposite side of the truck can also be surely demagnetized. As a result, an abnormal movement of the vehicle and development of the abnormality can be quickly avoided.

We claim:

1. A superconducting magnet abnormality detection and protection apparatus comprising:

magnetic flux detecting devices disposed inside of an outer vessel of at least one superconducting magnet, the at least one superconducting magnet including at least a superconducting coil, a load support for supporting the superconducting coil and the outer vessel, the outer vessel housing the superconducting coil, the load support and the magnetic flux detecting devices therein;

decision means for determining whether there is an abnormality in output voltage of the magnetic flux devices; and means selected at least one of alarm means for informing of an abnormal state on the basis of an output signal of the decision means, and protection means for protecting the superconducting magnet on the basis of the output signal.

2. A superconducting magnet abnormality detection and protection apparatus according to claim 1, wherein a relative movement between the superconducting coil and the outer vessel is magnetically detected.

3. A superconducting magnet abnormality detection and protection apparatus according to claim 1, wherein said decision means includes:

an amplifier for amplifying output voltage of the magnetic flux detecting devices;

a recorder for storing past output voltage values; and a comparing judgment device for comparing output voltage of the amplifier with voltage stored in said recorder and determining whether there is an abnormality in the superconducting magnet on the basis of a difference between the output voltage of the amplifier and the voltage stored in said recorder.

4. A superconducting magnet abnormality detection and protection apparatus according to claim 1, wherein said alarm means includes an alarm indicator, responsive to occurrence of an abnormality, for issuing an alarm and indicating the degree of the abnormality and a location of occurrence of the abnormality.

5. A superconducting magnet abnormality detection and protection apparatus according to claim 1, wherein said protection means includes:

a protector, responsive to occurrence of an abnormality, for sending a signal to interrupt a current flowing through the superconducting magnet on the basis of an output signal of the comparing judgment device; and a current interrupter for interrupting the current.

6. A superconducting magnet abnormality detection and protection apparatus according to claim 1, wherein said decision means includes:

amplifiers for amplifying output voltages of magnetic flux detecting devices attached to a plurality of superconducting magnets disposed in different positions in a running direction; and a comparing judgment device for taking in output voltages of devices attached to different magnets via the amplifiers and determining whether there is an abnormality in superconducting magnets on the basis of difference between the output voltages.

7. A superconducting magnet abnormality detection and protection apparatus according to claim 1, wherein the at least one superconducting magnet includes a plurality of superconducting magnets mounted on opposite sides of a vehicle, said decision means compares the output voltages of said magnetic flux detecting devices attached to the superconducting magnets disposed on opposite sides of the vehicle and in a same position in a running direction of the vehicle, and judges whether there is an abnormality in said superconducting magnets on the basis of difference between the output voltages.

8. A superconducting magnet abnormality detection and protection apparatus according to claim 7, wherein on the basis of the output signal of said decision means when an abnormality has occurred, said protection means interrupts currents of both the abnormal superconducting magnet and a superconducting magnet disposed on the opposite side of the vehicle from said abnormal superconducting magnet and in the same position in the running direction, and thereby demagnetizes both magnets.

9. A superconducting magnet abnormality detection and protection apparatus according to claim 1, wherein said decision means compares a past output voltage value of magnetic flux detecting devices with a current output voltage value thereof, and determines whether there is an abnormality in the superconducting magnet on the basis of difference between the past output voltage value and the current output voltage value.

10. A superconducting magnet abnormality detection and protection apparatus according to claim 1, wherein ground coils are disposed outside of the outer vessel, the magnetic flux detecting devices are disposed inside the outer vessel of the superconducting magnet so as to be opposite to the ground coils, and the magnetic flux detecting devices take shape suiting the shape of the superconducting magnet.

11. A superconducting magnet abnormality detection and protection apparatus according to claim 1, wherein ground coils are disposed outside of the outer vessel, the magnetic flux detecting devices are disposed inside the outer vessel of the superconducting magnet so as to be opposite to the ground coils, and the magnetic flux detecting devices are rectangular.

12. A superconducting magnet abnormality detection and protection apparatus according to claim 1, wherein ground coils are disposed outside of the outer vessel, the superconducting coil includes an upper device and a lower device, the magnetic flux detecting devices are disposed inside the outer vessel of the superconducting magnet so as to be opposite to the ground coils, and the magnetic flux detecting devices are wired so that a signal from the upper device of the superconducting coil and a signal from the lower device of the superconducting coil may cancel each other.

13. A superconducting magnet abnormality detection and protection apparatus according to claim 1, wherein ground coils are disposed outside of the outer vessel, the superconducting coil includes a left device and a right device, the magnetic flux detecting devices are disposed inside the outer vessel of the superconducting magnet so as to be opposite to the ground coils, and the magnetic flux detecting devices are wired so that a signal from the left device of the superconducting coil and a signal from the right device of the superconducting coil may cancel each other.

14. A superconducting magnet abnormality detection and protection apparatus according to claim 1, wherein:

ground coils are disposed outside of the outer vessel;

the superconducting coil includes an upper and lower right device and an upper and lower left device;

the magnetic flux detecting devices are disposed inside the outer vessel of the superconducting magnet so as to be opposite to the ground coils; and the magnetic flux detecting devices are wired so that a signal from the upper left device of the superconducting coil and a signal from the lower right device of the superconducting coil may cancel each other; and the magnetic flux detecting devices are wired so that a signal from the lower left device of the superconducting coil and a signal from the upper right device of the superconducting coil may cancel each other.

15. A superconducting magnet abnormality detection and protection apparatus according to claim 1, wherein the outer vessel includes an upper face and a lower face, the magnetic flux detecting device are disposed on the upper face and the lower face of the inside of the outer vessel of the superconducting magnet.

16. A superconducting magnet abnormality detection and protection apparatus according to claim 1, wherein the outer vessel includes vertical faces, the magnetic flux detecting devices are disposed on the vertical faces of the inside of the outer vessel of the superconducting magnet with respect to a running direction.

17. A superconducting magnet abnormality detection and protection apparatus according to claim 1, wherein the magnetic flux detecting devices are fabricated by winding conductors.

18. A superconducting magnet abnormality detection and protection apparatus according to claim 1, wherein the magnetic flux detecting devices comprise Hall effect devices.

\* \* \* \* \*